United States Patent [19]

Goto

[11] 3,951,866

[45] Apr. 20, 1976

[54] PROCESS FOR PREPARING CATALYSTS
[75] Inventor: Sotoji Goto, Yokosuka, Japan
[73] Assignee: Mitsubishi Jukogyo Kabushiki Kaisha, Tokyo, Japan
[22] Filed: Jan. 8, 1975
[21] Appl. No.: 539,439

Related U.S. Application Data
[63] Continuation of Ser. No. 399,381, Sept. 21, 1973, abandoned.

[30] Foreign Application Priority Data
Oct. 30, 1972 Japan............................. 47-109885

[52] U.S. Cl................................. 252/461; 252/430; 252/454; 252/456; 252/458; 252/463; 252/464; 252/465; 252/467
[51] Int. Cl.² ......................................... B01J 37/02

[58] Field of Search ........... 252/461, 430, 465, 471, 252/454, 467, 463

[56] References Cited
UNITED STATES PATENTS
2,214,930  9/1940  Littmann ........................... 252/461

Primary Examiner—Patrick P. Garvin
Attorney, Agent, or Firm—Toren, McGeady and Stanger

[57] ABSTRACT

A process for preparing a catalyst which comprises applying a mixture of an ester of a metallic acid and an alcohol on a carrier, causing the ester to gel with heat and deposit over the carrier surface, and then baking the coated carrier.

7 Claims, No Drawings

PROCESS FOR PREPARING CATALYSTS

This is a continuation of application Ser. No. 399,381, filed Sept. 21, 1973 and now abandoned.

This invention relates to a process for preparing catalysts.

In the manufacture of catalysts for use in various chemical reactions, it has been the customary practice, for enabling the carriers to carry the catalytic substances, to evaporate and concentrate a catalyst solution on the carrier, deposit the catalytic component by precipitation, or form a catalytic layer over the carrier surface with the use of adhesives. It has, however, been very difficult to effect uniform and solid deposition of a catalytic substance over a carrier, and it is desirable that the carrier be as porous in structure and as permeable as possible so as to hold the catalyst on it.

The present invention has for its object to provide a process that assures extremely uniform and solid deposition of catalytic substances over their carriers. Briefly, the process of the invention consists in applying an ester of an alcohol and an aqueous solution of an oxide of a metal to serve as a catalytic substance (hereinafter called a "metallic acid") on a carrier, heating the carrier to cause gelation and deposition of the ester thereon, and then baking the coated carrier thereby producing a solid bond between the carrier and the catalytic substance thereon. In this way, not only porous and adsorptive carriers, but also, materials, such as, glass, ceramics, and metals, which usually have surfaces which are too smooth to permit deposition of catalytic substances thereon can now be effectively used as carriers.

As described, the process of the invention is predicated upon the discovery that, if an ester of a metallic acid and an alcohol is heated to cause gelation and the resulting film which is uniformly deposited on the carrier is baked, the ester will be pyrolyzed and a rigid bond of the metal as a catalytic component to the carrier will be secured. The process, which is applicable to the preparation of many different catalysts, will be better understood from the following detailed description.

The choice of the metals to serve as the catalytic component in accordance with this invention is not critical. The metals may be suitably chosen, and used in the form of metallic acids, to meet the catalyst requirements of the particular reactions to be carried out. The metallic components are not always employed one at a time but, of course, two or more different metals may be used together. While the catalytic metals to form the metallic acids are usually selected from the transition metals in groups IVa to VIIa of the periodic table, it is possible to add metals of other groups if necessary.

The transition metals in groups IVa to VIIa include titanium, zirconium, vanadium, chromium, molybdenum, tungsten, and manganese. The metals of other groups that may be added include nickel, cobalt, copper, calcium, strontium, and zinc. Among typical metallic acids based on those metals are titanic acid ($TiO_4^-$), zirconic acid ($ZrO_4^-$), vanadic acid ($VO_3^-$), chromic acid ($CrO_4^-$), bichromic acid ($Cr_2O_7^-$), molybdic acid ($MoO_4^-$), tungstic acid ($WO_3^-$), and permanganic acid ($MnO_4^-$).

Alcohols of a number of varieties may be used in the process of the invention. They include monohydric alcohols, e.g., aliphatic, alicyclic, aromatic, and heterocyclic alcohols, dihydric alcohols, e.g., ethylene glycol and propylene glycol, and trihydric alcohols, e.g., glycerine. Of the aliphatic alcohols, those having five or more carbon atoms in the molecule and exhibiting as high a boiling point as possible, in particular higher alcohols, are preferred. For example, hexyl, octyl, decyl, and dodecyl alcohols give satisfactory results. Examples of the alicyclic, aromatic, and heterocyclic alcohols which may be used are, respectively, cyclopentanol and cyclohexanol, benzyl alcohol and cinnamyl alcohol, and furfuryl alcohol.

The esters of such metallic acids and alcohols may be prepared in the usual manner. The esterifying reaction takes place as a metallic acid and an alcohol are mixed with the application of heat. The reaction becomes increasingly vigorous at temperatures exceeding about 60°C up to about 300°C, preferably in the range between 200° and 250°C. The resulting ester gels whilst developing heat until it forms a film that can most evenly deposit over the carrier surface. To be more specific, a mixture of a solution of a metallic acid and an alcohol, with or without prior esterification to some extent, is applied on the carrier by suitable means such as an applicator or by dip coating. As the mixture is heated, its esterification progresses and the resulting ester covering the carrier surface gradually undergoes gelation to form a uniform film that evenly deposits over the entire carrier surface. This procedure is relatively simple. In addition, the ester thus obtained is characterized by its ability of adhering not merely to porous carriers but to glass and other smooth surfaces as well. A further feature of the invention is that, because the ester deposits in the form of a uniform film over the carrier, the amount of catalyst required can be reduced to a minimum.

As carriers, a wide range of materials may be adopted only if they have sufficient fire resistance to withstand the baking following the ester deposition. For example, the carriers that may be employed are not only such porous and adsorptive materials as diatom earth, bentonite, acid clay, activated clay and carbon, silica, and alumina, but also materials, such as, glass, ceramics, and metals, which are inferior in adsorption quality and have not been considered useful as carriers. These carriers may take suitable shapes, e.g., granuless chips, sheets, plates, wires, fibers, or knitted or woven fabrics, according to the intended applications of the catalysts. For instance, as will be illustrated in an example later, a catalyst using as its carrier, a knitted or woven fabric of glass fiber composed chiefly of silica and having a high melting point is flexible enough to stand vibrations and shocks and is ideal as a catalyst for the disposal of automotive emissions.

The carrier coated with the ester in the manner described is then baked to provide a finished catalyst. The baking decomposes the ester coat to secure a very solid bond of the metal as the catalytic component to the carrier surface. Here it is noted that the metal combined with the carrier is in the form of an oxide. For example, where a silica-based carrier is employed, an active metal oxide produced by the pyrolysis of the ester of catalytic metal reacts with the silica to form a metal silicate, that is, $M_2O + SiO_2 \rightarrow M_2SiO_3(M_2O \cdot SiO_2)$. The silicate enables the glass carrier to carry the catalytic metal with utmost solidity.

The baking temperature may be suitably chosen, usually within the range between 400° and 1100°C, preferably between 600° and 850°C. If necessary, the baking may be carried out in a reducing gas or other desirable atmosphere. It is also possible to place an unbaked ester-film-coated catalyst into an objective apparatus such as a catalytic reactor and then effect the baking as a preliminary stage of the catalytic reaction within that apparatus.

As has been described in detail, the present invention offers a number of advantages and possibility of achieving excellent effects because the catalyst metal component is deposited in the form of an ester on the carrier and baked together so as to provide an extremely uniform, solid bond between the catalyst and the carrier.

EXAMPLE 1

Five hundred parts (by weight) of an aqueous solution containing 20 mol% of chromic acid were mixed with 50 parts of 10 mol% nickel acetate. Further, 200 parts of propylene alcohol were added with stirring. The mixture was subjected to an esterifying reaction for 0.5 to 1 hour, and 750 parts of a relatively stable ester intermediate were obtained. The whole amount of the product was applied onto 1200 parts of a heat-resistant glass fiber cloth by dip coating. The esterification was completed by a heat treatment at 200° to 250°C for 0.5 to 1 hour. Next, the coated cloth was baked at 700° to 850°C for 1 hour. With the ester pyrolyzed in this way, a film of active metal oxide was solidly bonded to the surface of the heat-resistant glass fiber. The resultant was then activated in an atmosphere of a reducing gas that contained hydrogen, at 800°C for 1 hour.

The catalyst thus prepared, measuring 0.32 meter wide and 4.0 meters long, was used for the purification of exhaust emissions from an automobile. The experiment was conducted with the exhaust gases containing 2.5% carbon monoxide and hydrocarbons in a concentration of 370 ppm, at a space velocity of 65000 per hour. High rates of purification were attained with the catalyst adsorbing 94% of the CO content and 87% of the HC contents.

The same catalytic component combined with a granular γ-alumina gel also proved satisfactory for the purpose of cleaning automotive emissions.

EXAMPLE 2

To 150 parts (by weight) of a 15 mol% acidic molybdic acid solution, 75 parts of a 10 mol% cobalt acetate solution and then 75 parts of glycerine were added. After an esterifying reaction of the mixture for a period of 0.5 to 1 hour, a mixed solution of a relatively stable ester and its intermediate was obtained. With 300 parts of this mixed solution, 500 parts of granular γ-alumina 3 to 7 mm in diameter, were impregnated. The impregnated carrier was heated at 200° to 250°C for 1 hour to conclude the esterification. The resulting gel was further baked at 700° to 850°C for 1 hour, so that a film of active catalyst was formed on and inside the alumina granules.

The catalyst thus prepared was used in a vapor phase oxidizing reaction of methanol at a temperature of 100° to 150°C and a space velocity of 7500 per hour. Formaldehyde was obtained in a yield of 92%.

EXAMPLE 3

Two hundred fifty parts each (by weight) of an acidic vanadic acid solution (20 mol%), an acidic permanganic acid solution (10 mol%), and copper acetate (17 mol%) were mixed. Into this mixture was poured, with agitation, a mixed solution consisting of 125 parts each of cyclopentanol and ethylene glycol. The whole mixture was subjected to an esterifying reaction at 60°C for 1 hour. A mixed solution of a relatively stable ester and its intermediate resulted. With 250 parts of this solution, 4000 parts of a screen formed of 0.3 mm-dia. metallic wires (AISI 316) was dip coated, and the coated screen was heated at 200° to 250°C for one hour, thus effecting thorough esterification. Following the reaction, the screen was baked at 600° to 650°C for 0.5 hour to conclude the pyrolysis of the metallic ester and solidly bond the film of the active metal oxide catalyst to the metal wires. Finally the product was activated in an atmosphere of a reducing gas at 700°C for 1 hour.

The catalyst, in the form of a 14-mesh screen 0.32 meter wide and 4 meters long, was inserted into a converter for the purification of exhaust gases from a small diesel engine for the generation use. In an experiment conducted with exhaust gases containing 0.5% carbon monoxide, 150 ppm hydrocarbons, 1200 ppm nitrogen oxides, and 1% oxygen at a space velocity of 40000 per hour, the catalyst purified the emissions by removing 80% of the CO, 67% of the HC, and 90% of the NCx therefrom.

What is claimed is:

1. A process for preparing a catalyst which comprises coating an ester of a metallic acid and an alcohol onto a carrier, heating the coated carrier to cause the ester to gel and then baking the coated carrier at a temperature between 400° to 1,100° C. to form a film of the catalyst on the carrier.

2. The process of claim 1 wherein the metallic acid is of a metal selected from the group consisting of transition metals of groups IV$a$ to VII$a$ of the periodic table.

3. The process of claim 1 wherein the carrier is in the form of a sheet, plate, wire, fiber, or fabric of a material selected from the group consisting of glass, ceramic, and metal.

4. A process as claimed in claim 1 wherein the alcohol is at least one selected from the group consisting of monohydric, dihydric, and trihydric alcohols.

5. The catalyst prepared by the process of claim 1.
6. The catalyst prepared by the process of claim 2.
7. The catalyst prepared by the process of claim 3.

* * * * *